United States Patent [19]

Koppelmann

[11] 3,840,957
[45] Oct. 15, 1974

[54] SELF-SIZING BURNISHING TOOL
[75] Inventor: Eldo K. Koppelmann, Cumberland, R.I.
[73] Assignee: Amtel, Inc., Providence, R.I.
[22] Filed: July 2, 1973
[21] Appl. No.: 375,721

Related U.S. Application Data
[63] Continuation-in-part of Ser. No. 233,454, March 10, 1972, abandoned.

[52] U.S. Cl. .................................. 29/90 R
[51] Int. Cl. ............................. B21c 37/30
[58] Field of Search ..................... 29/90 R

[56] References Cited
UNITED STATES PATENTS

| | | | |
|---|---|---|---|
| 3,059,314 | 10/1962 | De Carbon | 29/90 R |
| 3,555,643 | 1/1971 | Kopplemann | 29/90 R |
| 3,736,633 | 6/1973 | Kalen | 29/90 R |
| 3,751,781 | 8/1973 | Kopplemann | 29/90 R |

FOREIGN PATENTS OR APPLICATIONS
1,013,606  8/1957  Germany .......................... 29/90 R Primary Examiner—Harrison L. Hinson
Attorney, Agent, or Firm—Barlow and Barlow

[57]  ABSTRACT

A self-sizing burnishing tool with a mandrel member having a frusto-conical end portion and a roller cage for engagement therewith which receives a plurality of frusto-conical rollers which are oriented substantially parallel to the axis of the mandrel member. Means are provided for relatively moving the cage and the mandrel member to fix a nominal size and additionally the relative position between the cage and the mandrel may be adjusted within limits automatically since the spring loaded means is inserted between the mandrel and the cage to allow for reasonable size variations of the work.

9 Claims, 5 Drawing Figures

SELF-SIZING BURNISHING TOOL

CROSS REFERENCE TO RELATED APPLICATION

This application is a continuation-in-part of my copending application Ser. No. 233,454, filed Mar. 10, 1972 and now abandoned.

BACKGROUND OF THE INVENTION

Roller burnishing tools are utilized principally for establishing a high grade finish on a work piece. Generally burnishing tools take the form of a roller cage and mandrel assembly in which the rollers are slightly skewed or oblique with respect to the axis of the mandrel to afford a planetary action as described in U.S. Pat. No. 2,843,918 dated July 2, 1958. This arrangement permits a tool once it is engaged with the work to feed automatically and when it comes to the end of the work piece being burnishing, means including a light spring between the mandrel and the cage, permit the cage to move relative to the mandrel and effectively go to a larger diameter or smaller diameter depending upon whether it is an internal or external tool but in any event permit the cage to easily be withdrawn from the part that has been burnished. If the part to be burnished has a variation in size, extreme pressures are developed as the burnishing progresses and oftentimes it is impossible with a tool such as is disclosed in the patent referred to above to operate where the variation in size is great as 0.010 inch (0, 3mm).

SUMMARY OF THE INVENTION

According to the present invention, a self-sizing driven roller burnishing tool is provided with a basic assembly consisting of a mandrel having a frusto-conical end portion and a roller cage which has a plurality of frusto-conical rollers therein which rollers are oriented substantially parallel to the axis of the mandrel member and are in pressure engagement relationship with the frusto-conical end portion of said mandrel member. Screw-threaded means are provided between these two members to adjust their relative position and the mandrel is in two parts with yieldable means exerting a force to maintain the mandrel against a stop in a pre-loaded condition and a pre-size set relationship. This structure in effect forms a coupling means between the roller cage and mandrel member. When this basic assembly is driven by coupling it to a machine so that in effect there is driving rotation between the parts to be burnished and the tool, and in addition an axial force is exerted at a certain rate so that feed of the tool onto the part or vice versa will be accomplished, then initially the rollers will engage the part to be burnished to a size that is normally found for this particular production part. If for some reason the part is oversize for an outside diameter burnishing tool or undersize for an inside diameter burnishing tool, considerable pressure will build up against the yieldable means that normally keeps the mandrel and roller cage adjusted and depending upon what setting the yieldable means has been designed to act on, the yieldable means may give and the mandrel tip part will move relative to the roller cage permitting the rollers to expand or contract to maintain optimum burnishing pressure and avoiding development of undue burnishing pressure. With an inside diameter tool, the rollers may move radially inward or in the connection of an outside diameter tool, they will move radially outward and in this way effectively accommodate the offsize variation without damaging the two parts and causing difficulty with the normal burnishing operation on the part itself as well as difficulty with the drive mechanism for creating the burnishing operation.

DESCRIPTION OF ONE EMBODIMENT

Figure 2:
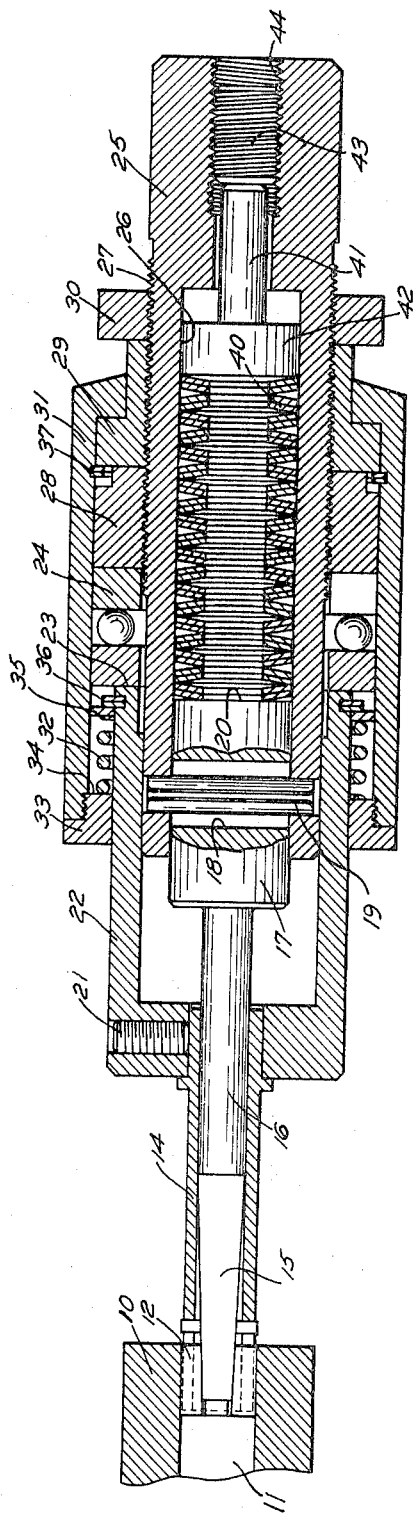
FIG. 2 is a similar central sectional view of the same tool in which the excessive burnishing pressure is built up and the yieldable means has given to permit the cage and mandrel tip to move relatively axially to change position and which change is greatly exaggerated.

The invention will first be described with reference to the inside diameter burnishing tool by referring to FIGS. 1 and 2 where a workpiece 10 is illustrated having a cylindrical bore surface 11 which is being contacted by frusto-conical rollers 12 that are held within a cage 14, the rollers 12 being maintained against a bore surface 11 by a cylindrical frusto-conical end portion 15 of a front part 16 of a mandrel member. The mandrel member front part 16 is enlarged at its rear end as at 17 and has a slot 18 therein, the mandrel member front part terminating in a rear face 20. The rear end of the cage 14 is secured by means of set screws 21 to an enlarged cage sleeve extension 22 of which a rear end face 23 abuts a thrust bearing 24. The rollers 12 are disposed with their longitudinal axes substantially parallel with and slightly oblique to the longitudinal axis of the mandrel member. A rear part of the mandrel has a driving shank 25 with a front bore 26 which receives the enlarged portion 17 of the front part 16 and a stop pin 19 passes through the slot 18 to connect the two mandrel parts so that they rotate in unison and so as to permit relative axial movement of said parts. The outer surface of the rear part is screw-threaded as at 27 and received on and in engagement with the screw-threads 27 of the shank 25 is a size adjusting nut 28 and a lock nut 29 together with a supplementary lock nut 30. A housing 31 surrounds the adjusting nut 28 and lock nut 29 as well as the bearing 24 and extends forwardly of the body of the tool to surround a release spring 32. The front end of the housing 31 has a retainer nut 33 screw-threaded therein and this retains the release spring 32 between the rear surface 34 of the nut 33 and a thrust washer 35 which bears against a split retaining ring 36 received in a groove on the inner end of the enlarged cage sleeve extension 22. A retaining ring 37 maintains the housing 31 in position relative to the parts just described.

Within the front bore 26 of the mandrel member rear part there is located a yieldable means illustrated as disc springs 40. These springs abut the rear face 20 of the enlarged rear end of the front part 16 of the mandrel and are compressed by a stud 41 with an enlarged end 42 which abuts the springs 40. The relative position of the stud 41 within the bore 26 may be adjusted by a set screw 43 received within a screw-threaded bore 44 of the shank 25. Effectively this set screw will preload the springs 40, and as seen in FIG. 1, forces the mandrel front part 16 forward against pin or stop means 19.

Figure 1:
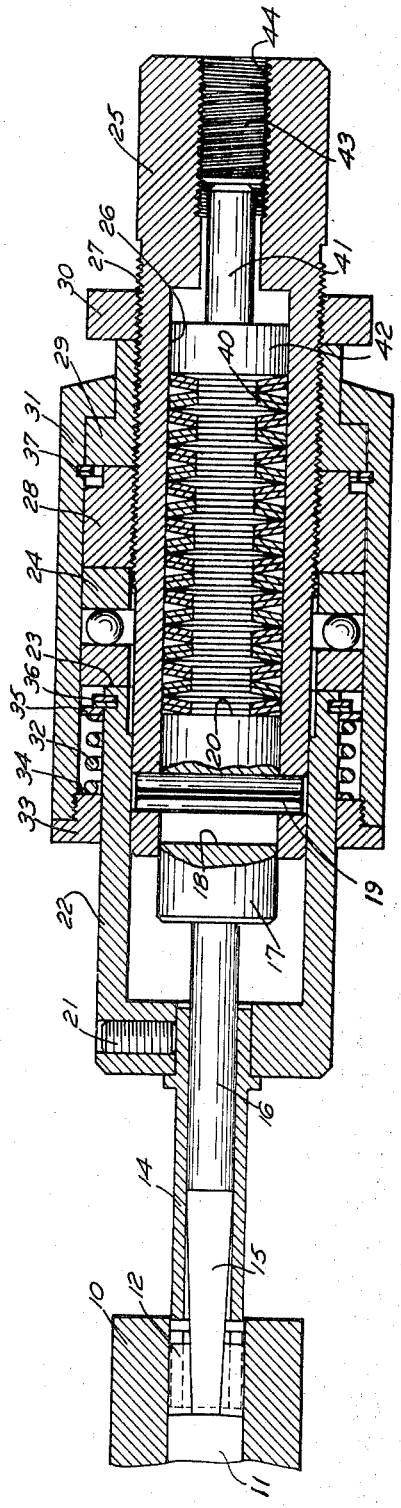
FIG. 1 is a central sectional view of an inside diameter burnishing tool embodiment showing it in normal operating position.

In operation, the size adjusting nut 28 can be rotated to effect an initial size adjustment so far as effective burnishing diameter is concerned of the rollers 12 on the frusto-conical mandrel tip 15, the pin 19 in slot 18 of the mandrel holding this adjustment and acting as a stop means as shown in FIG. 1. The tool is then inserted into the bore 11 of the work piece 10 by utilizing relative axial force of the tool in the work piece as well as relative rotative motion, by holding the workpiece and rotating the mandrel or vice versa. The feed of the roller burnishing tool is adjusted to be within normal axial feed rates known to those skilled in the art. If the size of the bore 11 as the tool proceeds inwardly thereof is less than the normal set size of the tool, excessive pressure will build up the rollers 12 bearing against the frusto-conical end 15 of the mandrel. The rollers will accordingly force the mandrel 16 to the right as viewed in the drawing and compress the disc springs 40 which act as a yieldable means. With the feed rate being kept constant and the rotative force constant, the tool will proceed and readjust itself to optimum burnishing pressure since a preload has been set on the disc springs 40. It will be seen, therefore, that a relatively simple arrangement has been achieved for a self-sizing roller burnishing tool which can vary within limits, the tool being initially set to maximum acceptable piece part size. Accordingly, within limits substantially of the order of 0.004 inch (0, 1mm) and utilizing disc springs, the tool will be self-sizing and will roller burnish a bore having a slight varying undersize diameter.

DESCRIPTION OF SECOND EMBODIMENT

Figure 3:
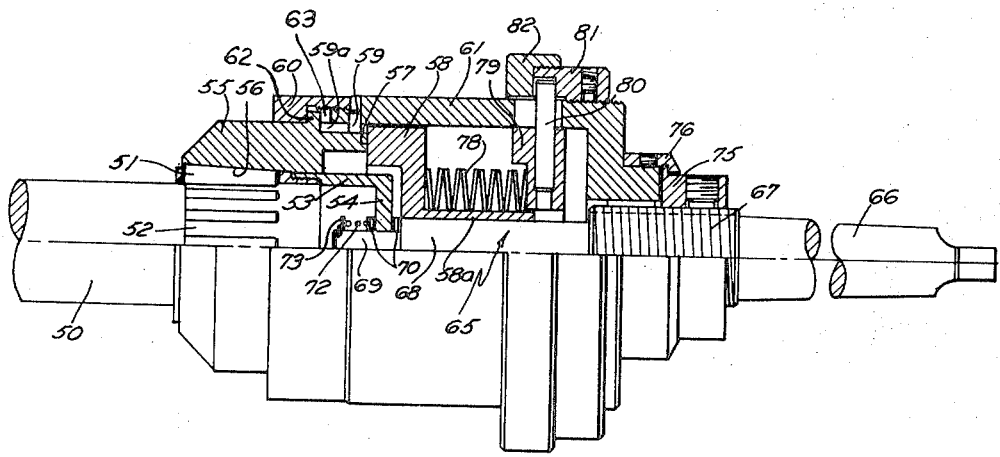
FIG. 3 is a half central sectional view of an outside diameter burnishing tool embodiment incorporating the same invention and in its normal operating position.
Figure 4:
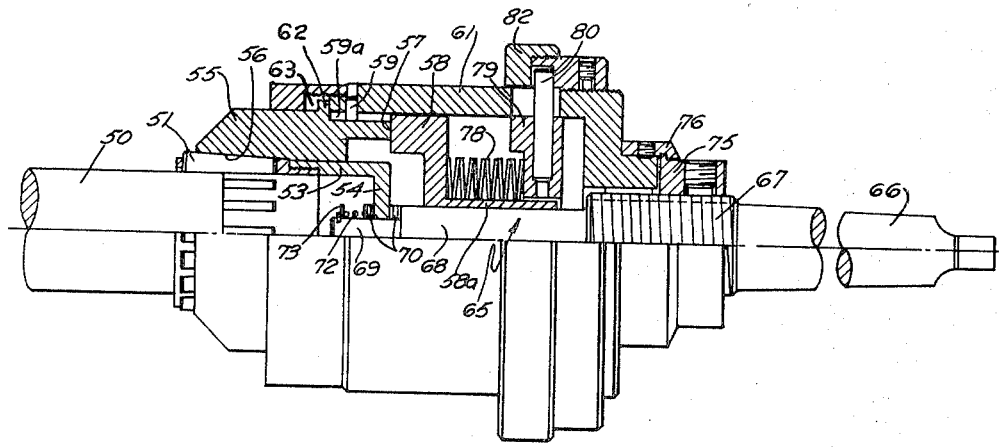
FIG. 4 is a similar partial central sectional view showing the relative position of the parts having varied axially on encountering an oversize portion of the workpiece to be burnished, the movement being greatly exaggerated.

Referring to FIGS. 3 and 4 a workpiece 50 has a cylindrical external surface to be burnished by an outside diameter burnishing tool having frustoconical rollers 51 that are retained in a roller cage 52 that has a roller cage extension 53 with a radially inward portion 54. The rollers 51 are engaged by a front part 55 of the mandrel having the usual frusto-conical inner surface 56 and the rear end of this front part 55 at 57 engages a spring guide block 58 which has a rear cylindrical sleeve portion 58a. The front part 55 or mandrel tip is maintained in position as shown by a retainer nut 60 which has screw-threaded engagement with a front end of a rear part 61 of the mandrel, which is also a housing, and normally abuts a flange 62 of the mandrel front part 55. A space 63 between nut 60 and mandrel rear part or housing 61 permits relative axial movement of the front and rear mandrel parts 55 and 61 respectively. Driving torque to the front part 55 is transferred from the rear part 61 by a plurality of radial pins 59 received in longitudinal slots 59a in the mandrel front part 55. In this manner it will be seen that a sliding joint is created between the two mandrel parts. A shank 65 has a driving end 66, screw-threaded portion 67 and two reduced front end portions 68 and 69. The radially inward end 54 of the cage extension is mounted on the portion 69 between a pair of thrust bearings 70 and a release spring 72 is mounted on said portion 69 and abuts a retainer ring 73 and front thrust bearing 70. It will be noted that the rear thrust bearing 70 abuts against an annular shoulder between the portions 68, 69 of the shank 65 and in this way the axial thrust of the cage 52 is transmitted to the shank 55 with freedom only to move to the left as viewed in the drawings against the light release spring 72 in a manner known to those skilled in this art. Upon the portion 68 of the shank 65 is received the cylindrical sleeve member 58a of the spring guide block 58 and on the screw-threaded portion 67 there is received a size adjusting nut 75. The size adjusting nut 75 is coupled to the rear mandrel part or housing 61 by a retaining collar 76 and as readily apparent from the drawing, the size adjusting nut 75 will move the mandrel rear part 61 and in turn the mandrel front part or tip 55 which is coupled thereto relative to the shank 65 and since the cage 52 is effectively coupled to the shank 65 relative axial adjustment can be made to adjust the effective burnishing diameter of the tool.

Upon the cylindrical sleeve portion 58a of the spring guide block 58 is mounted a plurality of disc springs 78. These disc springs abut at one end the guide block 58 and at the other end abut a pin ring 79 which is coupled via a plurality of radially inward extending pins 80 to a collar 81 which has screw-threaded engagement with the mandrel rear part or housing 51. A retaining nut 82 is provided for ease in assembly of the radially inward pins 80 and is screwed onto the adjusting nut and forms a unitary structure with the collar 81. Effectively it will be seen that the collar 81 will vary the amount of compression of the disc springs 78 which will preload the mandrel forcing the rollers 51 radially inwardly and will normally maintain flange 62 at the front edge of space 63 against nut 60 which serves as a stop means.

The operation of this outside diameter burnishing tool is substantially similar to the inside diameter burnishing tool previously described above. The tool is adjusted by the size adjusting nut 75 to minimum workpiece diameter and thus when the diameter of the work piece 50 becomes larger, this will tend to force the mandrel front part or tip 55 to the right as viewed in FIG. 4 compressing the disc springs 78, which will maintain optimum burnishing pressure.

DESCRIPTION OF THE THIRD EMBODIMENT

Figure 5:
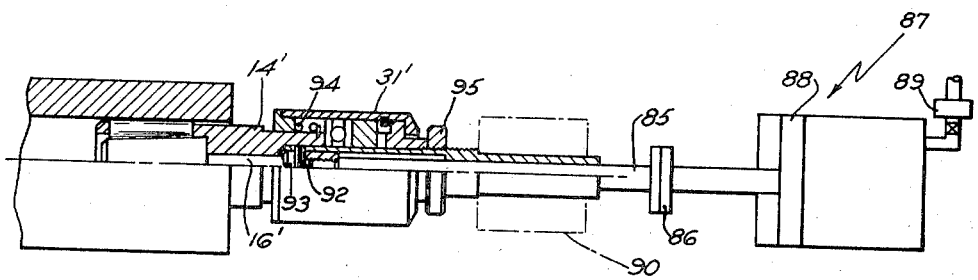
FIG. 5 is a diagrammatic view of a further inside diameter burnishing tool embodiment.

Referring to FIG. 5 there is shown in diagrammatic form a roller burnishing tool in which the mandrel member 16' is extended rearwardly through a bore in the shank to protrude therefrom. The mandrel extension member 85 is then coupled through a coupling 86 to a fluid pressure cylinder such as a pneumatic cylinder 87 having a piston 88. A hydraulic means, which could be air, is fed from a supply source to a regulator 89, and a valving means, to one side of the piston 88. In this fashion the yieldable means which has been previously described as disc springs is replaced by a pneumatic means and preloads the mandrel in the same fashion as the springs. Assuming that the roller burnishing tool is operated by a machine tool having a spindle 90 with a through bore, it can readily be appreciated that the cylinder 87 can be fed with air through a rotary air union, so that the piston 88 may, through the coupling 86, supply a preset axial force on the mandrel tip, thereby urging the rollers radially inward or radially outward depending whether or not an inside diameter or outside diameter burnishing tool is being utilized. The hydraulic means behind the piston being of a compressible nature will act in the same manner as the disc springs but will exhibit a constant spring rate over a large range and enable the tool to be self-sizing up to 0.010 inch (0, 3mm).

The mandrel is restricted in its movement relative to the cage by a pin 92 that is received in the mandrel slot 93. The tool is of usual configuration and is provided with a release spring 94 between the cage sleeve extension 14' and housing 31', and the effective burnishing diameter of the tool may be adjusted by operation of the adjusting nut 95 that will adjust the relative axial positions of the cage and mandrel 16'.

I claim:

1. A self-sizing roller burnishing tool comprising basic assembly of a mandrel having a frusto-conical end portion and a roller cage having a plurality of frusto-conical rollers held therein substantially in line with the axis of the mandrel member which rollers constitute a group of rollers that are in contact with the frusto-conical end portion of the mandrel member to establish diameter, means for driving and feeding said basic assembly relative to a work piece, means for adjusting the relative position of the rollers and mandrel in preset relationship, yieldable means exerting an axial force in a direction to move the rollers radially in contact with the work piece, said yieldable means being operable to permit the mandrel to move axially and permit the rollers to move away from the work upon excessive burnishing pressure being developed.

2. A tool as in claim 1 wherein the yieldable means exerts an axial force on the mandrel member.

3. A tool as in claim 1 including a driving shank, said shank having an abutment means thereon, said roller cage being held against said abutment means, said mandrel being slidable relative to said shank.

4. A roller burnishing tool as in claim 1 wherein the yieldable means can be adjusted to exert a preset pressure between the mandrel front and rear parts.

5. A roller burnishing tool as in claim 1 wherein the effective burnishing diameter of said tool can be adjusted.

6. A tool as in claim 1 wherein the means for adjusting the relative position of the mandrel and rollers comprises a screw-threaded joint between said mandrel and said roller cage.

7. A roller burnishing tool as in claim 1 wherein the yieldable means is spring means.

8. A roller burnishing tool as in claim 1 wherein the yieldable means is fluid pressure means.

9. A tool as in claim 1 wherein the mandrel has a sliding joint along its length, said joint having means to rotate both mandrel parts, stop means in said joint, said joint being normally urged in a direction to maintain the rollers on the mandrel in an expanded or contracted condition against said stop means.

* * * * *